July 4, 1933.   C. D. PETERSON   1,916,892
GEAR SHIFTING MECHANISM FOR AUXILIARY GEAR SETS
OF CHANGE SPEED TRANSMISSION GEARING
Filed March 12, 1932   3 Sheets-Sheet 1

INVENTOR.
Carl D. Peterson
BY
Badell & Thompson
ATTORNEYS.

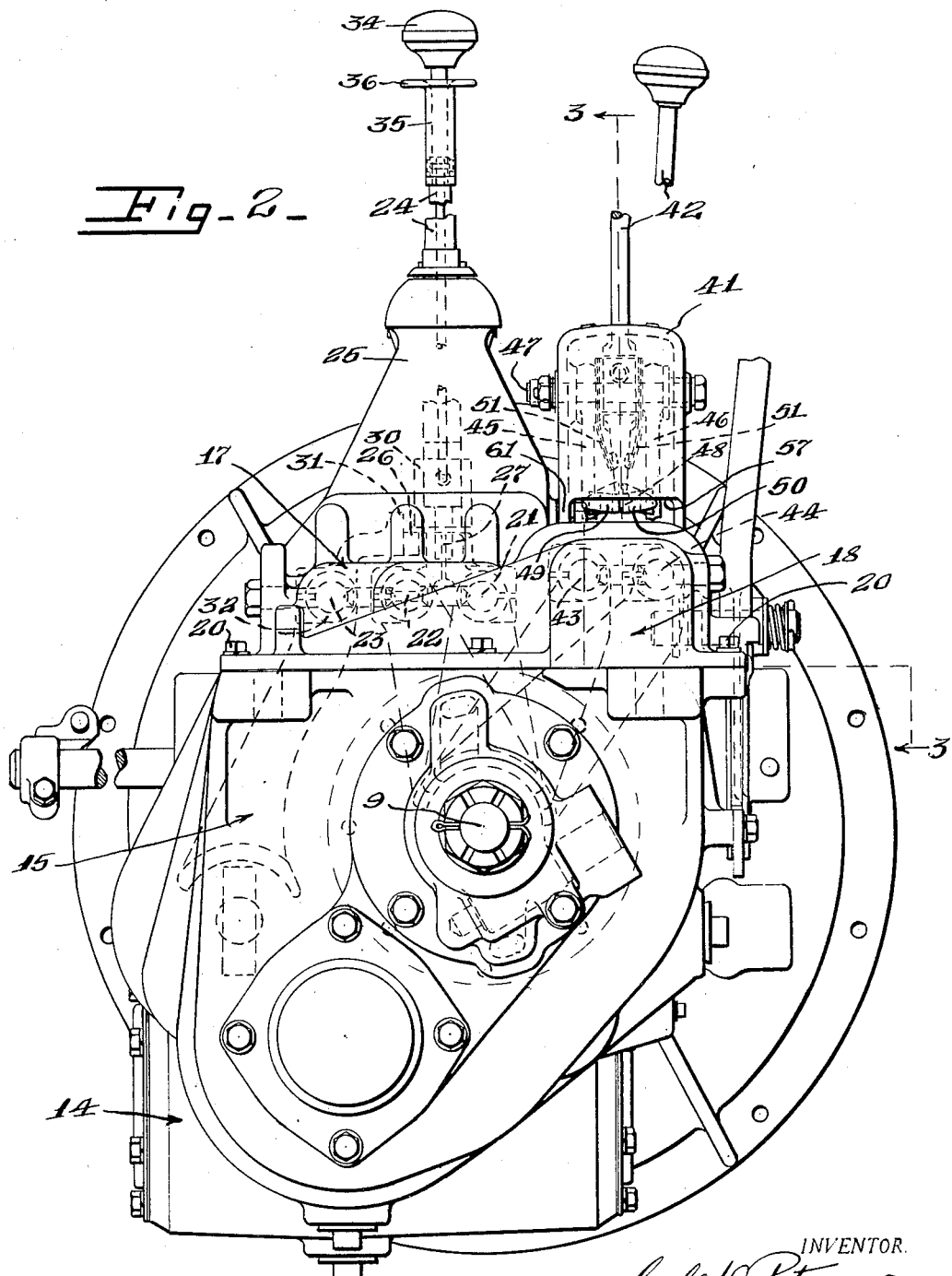

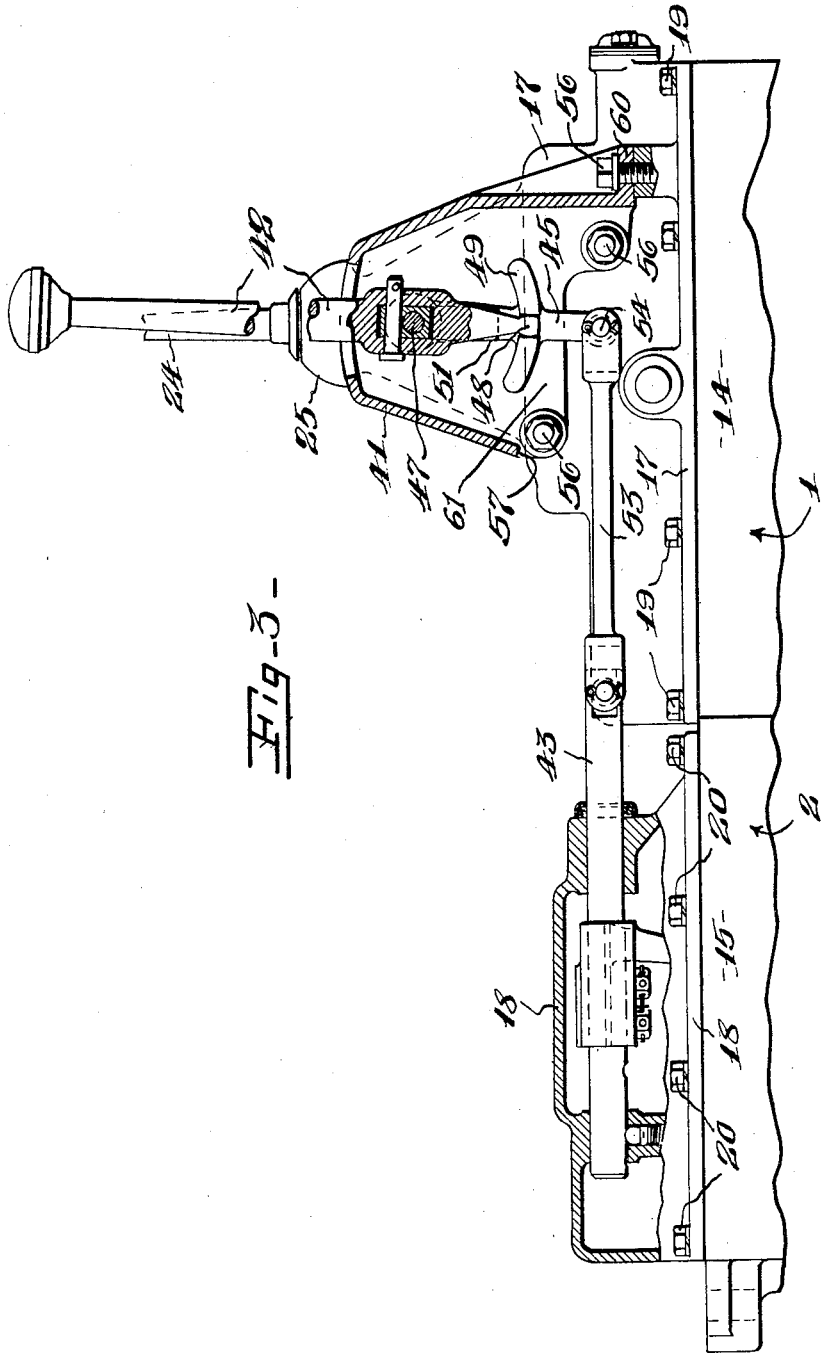

Patented July 4, 1933

1,916,892

UNITED STATES PATENT OFFICE

CARL D. PETERSON, OF TOLEDO, OHIO, ASSIGNOR TO SPICER MANUFACTURING CORPORATION, OF TOLEDO, OHIO, A CORPORATION OF VIRGINIA

GEAR SHIFTING MECHANISM FOR AUXILIARY GEAR SETS OF CHANGE SPEED TRANSMISSION GEARING

Application filed March 12, 1932. Serial No. 598,436.

This invention relates to change speed transmission gearing, and has for its object, a particularly simple and efficient gear shifting mechanism which can be readily and economically applied as a unit in manufacturing to a main gear set when an auxiliary gear set is applied to the main gear set.

The invention consists in the novel features and in the combinations and constructions hereinafter set forth and claimed.

In describing this invention, reference is had to the accompanying drawings in which like characters designate corresponding parts in all the views.

Figure 2 is a rear elevation of parts seen in Figure 1.

Figure 3 is a sectional view, partly in elevation, taken approximately on line 3—3, Figure 2.

Figure 1:
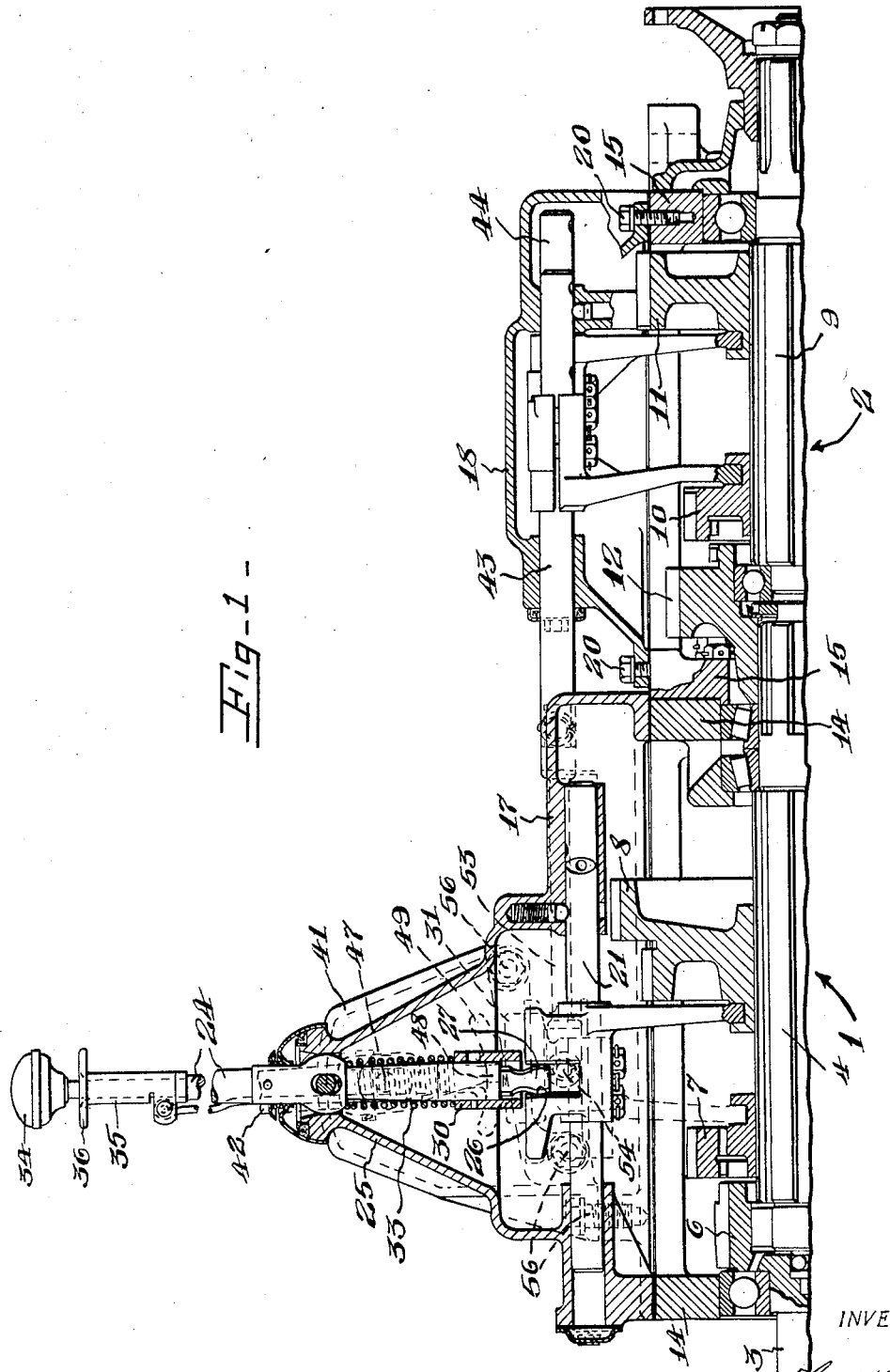
Figure 1 is a fragmentary, longitudinal, sectional view of a main and auxiliary gear set unit embodying this invention.

The ordinary commercial transmission gearing includes a single gear set having a standard number of forward speeds, and one reverse, and transmission gearings for some vehicles, as trucks, busses, etc., have a greater number of forward and reverse speeds. For economy in manufacture, it is desirable that a standard gear set be used when building a gear set having more speeds than standard, or in other words, in producing a transmission gearing with a greater number of speeds, that the additional speeds be provided by adding an auxiliary gear set to the standard gear set.

The standard gear set has its own gear shifting mechanism, and the auxiliary set must be provided with its gear shifting mechanism, and the gear shifting mechanism for the auxiliary set should be correlated with the gear shifting mechanism of the main gear set.

The principal object of this invention is the mounting of the gear shifting mechanism for the auxiliary set relatively to the gear shifting mechanism of the main gear set, so that an auxiliary gear set with its gear shifting mechanism can be added to a main gear set with its gear shifting mechanism in a simple and economical manner.

1 and 2 designate generally, the main and auxiliary gear sets, these being preferably arranged one in front of the other. These gear sets may be of any suitable form, size, and construction. The main gear set includes the usual drive shaft 3, transmission shaft 4, and the countershaft, not shown. The drive shaft 3 is the stem of a gear 6 within the gear box, the shiftable clutch element of the main clutch of the vehicle being mounted on the stem or shaft 3. The main gear set also includes shiftable elements, or gears, as 7 and 8, these being usually mounted to slide axially of the transmission shaft 4.

The auxiliary gear set includes a main shaft 9 usually arranged in axial alinement with the transmission shaft 4, a countershaft, not shown, with gearing between the rear end of the transmission shaft 4 and the countershaft of the auxiliary gearing, and also between said countershaft and the main shaft 9 of the auxiliary gearing. The auxiliary gearing includes shiftable elements 10 and 11, as sliding gears, mounted on the shaft 9. The element 10 is provided with a clutch face and is shifted forwardly from neutral to clutch the gear 10 directly to the gear 12 on the rear end of the transmission shaft 4, and is also shiftable rearwardly from neutral to produce one speed through the countershaft of the auxiliary gearing. The gear 11 is also shiftable into and out of mesh with the gear on the countershaft of the auxiliary gearing to produce another speed through the countershaft.

Normally, when the main gear set only is being used, the transmission shaft 4 and shaft 9 of the auxiliary gearing are clutched directly together by engaging the clutch face of the gear 12 with that of the gear 10 in direct drive relation. An additional speed forward with any one of the forward speeds of the main gear set is obtained by shifting the gear 10 out of direct drive engagement with the gear 12 and into mesh with one of the gears on the countershaft of the auxiliary gearing. Another additional speed forward with each of the forward speeds of the main gear set is obtained by shifting the gear 11 forwardly into mesh with another gear on the countershaft of the auxiliary gearing.

In the illustrated embodiment of my invention, the main gear set produces four speeds forward, and one reverse and hence, each of these speeds can be added to through the gears 10 and 11 of the auxiliary gear set, so that the entire transmission gearing has a range of twelve speeds forward, and three reverse speeds. The gear sets are mounted in a suitable housing and preferably, this housing includes a separate standard gear box 14 for the main gear set, and an additional gear box 15 for the auxiliary, or rear gear set, the gear box 15 being detachably mountable on, or detachably applicable to, the main gear box, it being secured to the rear wall of the main gear box in any suitable manner.

The construction of the gear sets and the detachable mounting of the rear gear box on the front gear box per se, forms no part of this invention.

Each gear box has its own cover, which is detachably secured thereto. 17 designates the cover of the main gear box, and 18 the cover of the auxiliary gear box, these being secured to the gear boxes in any suitable manner, as by screws 19 and 20.

The shifting mechanism for the shiftable elements, or gears 7 and 8 of the main gear set, may be of any suitable construction. That here shown comprises a plurality of shifters, as shift rods 21, 22, 23, slidably mounted in the cover 17 in the usual manner, and a selecting and gear shifting lever 24 mounted in the cover or tower 25 thereon to have a lateral selecting movement with any one of the rods 21, 22, 23, and a fore and aft shifting movement when in any selected position. The rods are connected to the parts they shift in the usual manner, that is, by forks carried by blocks on the shift rods respectively, the blocks having notches 26 for receiving the usual finger 27 at the lower end of the lever 24.

The rod 23 is a reverse shift rod, and usually means is provided for preventing unintentional engagement of the gear shifting lever 24 with the reverse shift rod. This means consists of a locking member 30 which encounters a barrier 31 on the block 32 of the shift rod 23, which lock must be manually operated to clear the barrier before the finger at the lower end of the gear shifting lever 24 can enter the notch of the block 32. This lock is here shown as a sleeve slidable axially of the lower end of the lever 24 against the action of a spring 33, and the lock is operated by a handle located adjacent the ball or handle 34 of the lever 24.

35 designates the handle, by means of which the lock 30 is operated, and in order that this handle may be readily found, or grasped, it is in the form of a sleeve, slidable axially of the upper end of the gear shifting lever and having a circumferential flange, or finger engaging portion 36, by means of which it is lifted upwardly against the action of a returning spring 38. Heretofore, these operating levers have been levers, or triggers, which the operator oftentimes does not readily, or unconsciously, find, and has to hunt for. By reason of the circumferential flange 36, the operator can easily grasp the handle 35, and does not have to make a conscious effort to find it when he intends to operate the latch, or lock member 30.

The shifting mechanism for the shiftable elements, or gears 10, 11, of the auxiliary gear set includes shifters carried by the cover 18 of the auxiliary gear box, a support or tower 41 detachably mounted on the cover 17 for the front gear box, motion transmitting parts carried by said support or tower 41, flexible connections between said parts and the shifters for the auxiliary gear set, and a selecting and gear shifting lever 42 carried by said support for coacting with said parts respectively to select and shift the same so that the shifters for the rear auxiliary gear set are carried by the cover of the rear gear box, and the operating means for these shifters constitute a unit which can be readily applied to the cover of the main gear box. The lever 42 is mounted on the tower 41 in any suitable manner to have a lateral selecting movement, and a fore and aft shifting movement.

The shifters for the auxiliary or rear gear set are preferably shift rods 43 and 44 slidably mounted in the cover 18 for the rear gear box and extending forwardly out of the same toward the front gear box.

The motion transmitting parts are here shown as a pair of levers 45 and 46 mounted on a pivot pin 47 extending transversely through the tower 41, these being located on opposite sides of the lever 42 which is also mounted on the pivot 47 to have a lateral selecting movement, and a fore and aft shifting movement. This lever 42 has a finger 48 at its lower end for entering notches in blocks 49 and 50 at the lower ends of the levers 45 and 46 respectively, these notches being normally arranged in alinement so that the lever 42 can be operated to select either one of them, and the notch of the selected block being moved out of alinement with the notch of the other block when shifted, all as will be uderstood by those skilled in the art. The lever 42 is acted upon by springs 51 which tend to return it to central position with respect to its lateral shifting movement when the notches are in alinement. The flexible connections between the parts or levers 45, 46, are here shown as links, as the link 53 pivoted at its front end at 54 to the lever 45 or 46, and at its rear end to the front end of the rod 43 or 44. The tower 41 is secured to the main body of the cover 17 for the front gear box in any suitable manner, as by screws 56, and has a slot or opening 57 through which the links 53 extend over the cover 17 to the exposed front ends of the rear shift rods 43, 44.

As best seen in Figures 2 and 3, the tower 41 is open at its rear end and outer side, and has a base portion 60 at its front side resting on the cover 17, and a flange 61 at the lower end of its side toward the tower 25 which laps the base of the tower 25. The base portion 60 and the flange 61 are secured to the cover 17 and the base of the tower 25 by the screws 56.

Thus, the tower 41, gear shifting lever 42, levers 45 and 46, and links 53, are a unit which can be applied to the cover of a standard main gear set when an auxiliary gear set is applied to the main gear set. The front end of the shift rods 43, 44, of the auxiliary set are located above the level of the cover 17 of the main gear set, and the links extend out of the base of the tower 41 over the rear portion of the cover 17. It is obvious that by reason of the unitary structure of the auxiliary gear shifting lever 42, its support or tower 41, supporting levers 45, 46, and links 53, that the gear shifting mechanism for the shift rod of the auxiliary gear set can be readily applied to the cover of the main gear box adjacent the main gear shifting lever 24, or that the gear shifting mechanism of an auxiliary gear set, to be applied to a main gear set, can be readily correlated with the shifting mechanism of the main gear set without modifying the main gear shifting mechanism or the cover for the main gear box.

What I claim is:

1. In a change speed gearing, the combination of a main gear set, an auxiliary gear set, and a housing, in which they are mounted, including a main gear box, and an auxiliary box detachably mounted on the main gear box, said gear sets including shiftable elements, means for shifting said elements including shift rods, a selecting and gear shifting lever for operating the shift rods of the main gear set, an auxiliary gear shifting lever for operating the shift rods of the auxiliary set, covers for the gear boxes in which the shift rods for the sets are mounted respectively, the cover for the main gear set including a tower in which the main gear shift rod is mounted, and a second tower in which the auxiliary gear shifting lever is mounted, the second tower being mounted on the cover of the main gear box, motion transmitting connections between the auxiliary shifting lever and the auxiliary shift rod, said connections being supported by the second tower, and means for detachably securing the second tower to the cover.

2. In a change speed gearing, the combination of a main gear set, an auxiliary gear set in the rear of the main gear set, each gear set including a shiftable element, a housing having compartments for the gear sets, covers for the compartments, shift rods for the shiftable elements of the sets mounted respectively in the covers, a gear shifting lever carried by the cover for the main gear set, and cooperating directly with the shift rod for the main gear set, a second gear shifting lever for the rod of the auxiliary set, a support therefor detachably mounted on the cover for the main gear set, and motion transmitting connections between said second lever and the shift rod for the auxiliary set, said connections being carried by the support for the second lever.

3. In a change speed gearing, the combination of a main gear set, an auxiliary gear set in the rear of the main gear set, each gear set including a shiftable element, a housing having compartments for the gear set, covers for the compartments, shifting mechanism for the shiftable elements including shift rods mounted respectively in the covers, a gear shifting lever carried by the cover for the front gear set, the lever for the front gear set cooperating directly with the shift rod for the front gear set, a second shifting lever for the auxiliary set, a support therefor detachably mounted in the cover for the main gear set, connections between the second lever and the rod for the rear gear set, said connections being carried by said support, and including a supporting lever pivoted to said support, and a link connecting the supporting lever and the rear shift rod.

4. In a change speed gearing, the combination of main and auxiliary gear sets having shiftable elements, one gear set being arranged in front of the other, a housing having compartments in which the gear sets are mounted, covers for the compartments, gear shifting mechanisms for the shiftable elements of the gear sets, the gear shifting mechanism for the main gear set including a plurality of shift rods mounted in the cover for the compartment in which the main gear set is located, and a selecting and gear shifting lever carried by the cover and coacting with said rod, the shifting mechanism for the shiftable elements of the auxiliary gear set including a plurality of shift rods mounted in the cover for the compartment in which auxiliary gear set is located, a support detachably mounted on the cover for the front gear set, supporting levers carried by the support, links connecting the lower ends of the supporting levers and the shift rods of the auxiliary gear set, a second shifting lever carried by said support and having means for selectively engaging and shifting said supporting levers.

5. In a change speed gearing, the combination of a main gear set, and an auxiliary gear set, one gear set being arranged in front of the other, a housing having compartments in which the gear sets are located, the gear sets including shiftable elements, covers for the compartments, gear shifting mechanisms for the shiftable elements of the gear sets, the mechanism for the main gear set including shifters carried by the cover within the compartment of the main gear set, and a selecting and gear shifting lever carried by the cover for the main gear set and coacting with said shifters, the cover for the compartment for the main gear set having a tower in which the gear shifting lever is mounted, the shifting mechanism for the auxiliary gear set including a plurality of shifters mounted in the cover of the compartment in which the auxiliary gear set is located, and motion transmitting means detachably mounted on the cover for the compartment of the main gear set, flexible connections between the motion transmitting means and the shifters for the rear set, and a second selecting and shifting lever detachably mounted on the cover for the main gear set for coacting with said motion transmitting means.

6. In a change speed gearing, the combination of a main gear set, and an auxiliary gear set, one gear set being arranged in front of the other, a housing having compartments in which the gear sets are located, the gear sets including shiftable elements, covers for the compartments, gear shifting mechanisms for the shiftable elements of the gear sets, the mechanism for the main gear set including shifters carried by the cover within the compartment of the main gear set, and a selecting and gear shifting lever carried by the cover for the main gear set and coacting with said shifters, the cover for the compartment for the main gear set having a tower in which the gear shifting lever is mounted, the shifting mechanism for the auxiliary gear set including a plurality of shifters mounted in the cover of the compartment in which the auxiliary gear set is located, and a tower detachably mounted on the cover for the compartment of the main gear set, motion transmitting parts carried by the tower, flexible connections between the said parts and the shifters for the rear set, and a selecting and shifting lever carried by the detachable parts for coacting with said parts.

7. In a change speed gearing, the combination of a main gear set, an auxiliary gear set, said gear sets including shiftable elements, a gear box for the main gear set, a gear box for the auxiliary gear set detachably mounted on the former gear box, covers for the gear boxes, shifting mechanism for the shiftable elements of the gear sets, the shifting mechanism for the main gear set including shift rods mounted in the cover of the main gear box, and a selecting and gear shifting lever carried by said cover and coacting with the shift rods, the mechanism for shifting the rods of the auxiliary set including shift rods mounted in the cover for the auxiliary gear box, a tower detachably mounted on the cover for the main gear box, motion transmitting parts carried by said tower, link connections between the motion transmitting parts and the shift rods of the auxiliary set, and a selecting and shifting lever carried by said tower and coacting with said parts to select and shift the same.

8. A change speed gearing including a main gear set, an auxiliary gear set, each gear set including shiftable elements, a gear box for the main gear set, and a gear box for the auxiliary gear set detachably mounted on the main gear set, covers for the gear boxes respectively, gear shifting mechanism for the main gear set including a selecting and shifting lever carried by the cover of the main gear box, and shifting mechanism for the auxiliary gear set including shifters located in the auxiliary gear box, and operating mechanism including a support detachably mountable on the cover of the main gear box, a shifting lever carried by the support, motion transmitting parts with which the lever cooperates, said parts being carried by the support, and connections between the motion transmitting parts and the shifters in the auxiliary gear box.

9. In a change speed gearing, the combination of main and auxiliary gear sets, and a housing therefor, the gear sets including shiftable elements, means for shifting said elements including shift rods, a selecting and gear shifting lever for operating the shift rods of the main set, an auxiliary gear shifting lever for operating the shift rods of the auxiliary set, cover means for the housing formed with a tower in which the main gear shifting lever is mounted, a second tower for the auxiliary gear shifting lever detachably mounted on said cover means, and motion transmitting connections between the auxiliary gear shifting lever and the auxiliary shift rod supported from the second tower independently of the housing, whereby the second tower, gear shifting lever therein, and connections operated thereby, are a self contained unit.

10. In a change speed gearing, the combination of main and auxiliary gear sets, and a housing therefor, the gear sets including shiftable elements, cover means for the housing, shift rods for the main and auxiliary gear set, the cover being provided with a tower, and the selecting and gear shifting lever for the main gear set mounted in the tower, a second tower detachably mounted on the cover means, an auxiliary gear shifting lever, and connections operated thereby for shifting the auxiliary shift rod mounted in and self contained with the second tower, whereby the auxiliary gear shifting member is mountable as a unit on the cover means.

In testimony whereof, I have hereunto signed my name, at Toledo, in the county of Lucas, and State of Ohio, this 29th day of February, 1932.

CARL D. PETERSON.